W. M. ROADES.
CASING HEAD.
APPLICATION FILED SEPT. 2, 1919.

1,343,477.

Patented June 15, 1920.

W. M. Roades
Inventor,

Witness
F. B. Wooden

By C. A. Snow & Co.
Attorneys.

UNITED STATES PATENT OFFICE.

WESLIE MARCH ROADES, OF OKMULGEE, OKLAHOMA.

CASING-HEAD.

1,343,477. Specification of Letters Patent. Patented June 15, 1920.

Application filed September 2, 1919. Serial No. 321,034.

*To all whom it may concern:*

Be it known that I, WESLIE MARCH ROADES, a citizen of the United States, residing at Okmulgee, in the county of Okmulgee and State of Oklahoma, have invented a new and useful Casing-Head, of which the following is a specification.

It is the object of this invention to provide a novel head, adapted to be mounted on a well casing to control the flow of oil or other liquid therefrom.

The invention aims to provide, in a device of the sort above alluded to, novel means for controlling and operating the gates which, in turn, regulate the flow of the liquid.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
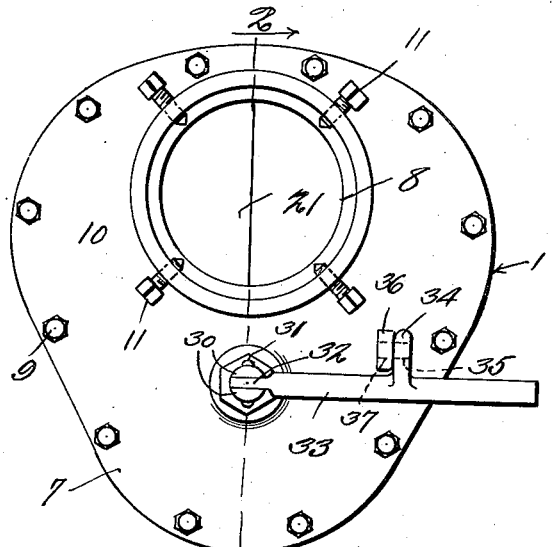
Figure 2:
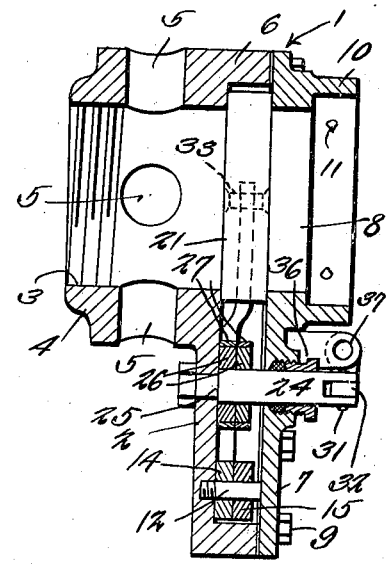
Figure 3:
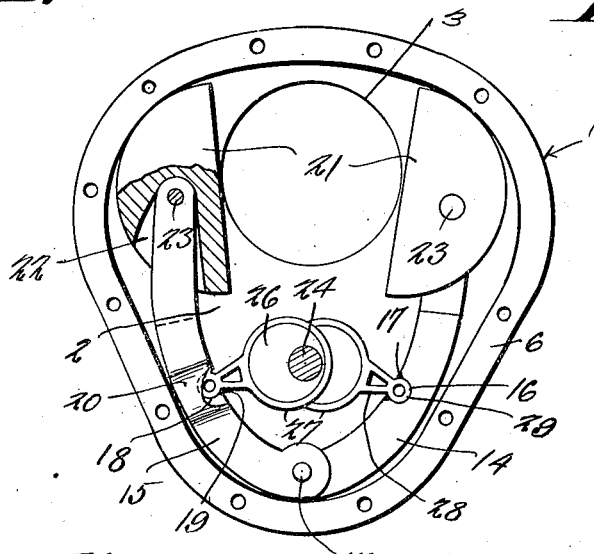

Figure 1 shows in top plan, a device constructed in accordance with the invention; Fig. 2 is a section on the line 2—2 of Fig. 1; Fig. 3 is a top plan, the lid of the casing being removed, and parts appearing in section.

In carrying out the invention, there is provided a casing, denoted generally by the numeral 1, the casing including a base 2 having an opening 3 surrounded by a depending collar 4 having any desired number of lateral apertures 5. The base 2 is supplied with an upstanding marginal flange 6 on which a lid 7 is mounted, the lid having an opening 8 disposed above the opening 3 in the base 2, the lid being held on the flange 6 by securing devices 9 of any desired sort. The lid 7 carries a tubing 10 disposed about the opening 8, set screws 11 being threaded into the member 10, so as to hold the tubing therein, the well casing being received in the collar 4.

The base 2 carries a pivot element 12 on which arms 14 and 15 are mounted to swing, the arm 15 being superposed on the arm 14. The arm 14 is provided in its inner edge, with a recess 16 extended entirely through the arm, the recess having a flared mouth 17. A similar recess 18, flared at 19 is fashioned in the inner edge of the arm 15, a portion of the arm extending across the upper end of the recess, as shown at 20.

The invention comprises a pair of gates 21 which may be semi-circular in form, the gates being mounted to slide on the base 2 and being adapted to control the flow of liquid through the openings 3 and 8. The gates 21 are supplied in their edges with openings 22, into which the free ends of the arms 14 and 15 extend, the gates carrying pivot elements 23 on which the free ends of the arms are mounted to swing.

The numeral 24 denotes a shaft, the lower end of which is journaled in a seat 25 fashioned in the base 2 of the casing 1, the shaft being mounted to rotate in the lid 7 and projecting upwardly above the lid. Eccentrics 26 are carried by the shaft 24 and are engaged by straps 27 having arms 28 terminating in heads 29, received, respectively, in the recess 16 of the arm 14, and in the recess 18 of the arm 15. The strap 27 on the lowermost eccentric cannot slide downwardly because it is engaged with the base 2. The upper eccentric prevents the said strap from moving upwardly. Therefore, the head 29 of the lowermost eccentric will remain engaged with the recess 16 in the arm 14. The strap 27 on the uppermost eccentric is prevented from moving downwardly by the lowermost eccentric, the upward movement of the said strap being prevented, because the head of the said eccentric is engaged with the part 20 of the arm 15. Therefore, the head 29 of the uppermost eccentric will remain in the recess 18 of the arm 15. The construction is such, however, that the arms 15 and the straps 27 may be removed at any time, readily, for renewal or repairs.

The upper end of the shaft 24 is provided with fingers 30 carrying a pivot element 31. The reduced end 32 of a handle 33 is received between the fingers 30 and is mounted to swing on the pivot element 31 in a plane at right angles to the casing 1. The handle 33 has a lateral ear 34 provided with an opening 35. The lid 7 carries a stop projection 36 provided with an opening 37 adapted to coöperate with the opening 35 in the ear 34. The lid 7 is provided, also with a stop projection 38.

In practical operation, the handle 33 may be swung toward the projection 36 until the opening 35 in the ear 34 is alined with the opening 37 in the projection 36. Through these alined openings, a pad lock or other securing device (not shown) may be inserted. The gates 21 will be held closed under such circumstances. When the shaft 24 is rotated through the instrumentality of the handle 33, the eccentrics 26 coact with the straps 27 and cause the arms 28 to swing toward each other, the gates 21 moving into abutment and into closed position with respect to the openings 3 and 8. Under the circumstances above pointed out, the upwardly moving oil or other liquid is directed through the apertures 5 in the collar 4 to tanks or other places of delivery. A counter-clockwise rotation of the shaft 24 closes the gates 21. If the shaft 24 be rotated by means of the handle 33, in a clockwise direction, until the handle engages the projection 38, then the gates will be opened.

The device forming the subject matter of this application is simple in construction and light in weight. It provides a certain and positive means for closing off oil and gas wells at the will of an operator. The construction is such, further, that the gates may be locked in closed positions. The device may be operated readily in the dark, hence, it is necessary, merely, to bring the handle 33 until that element abuts either against the projection 36, during the closing operation, or against the projection 38 during the opening operation.

Having thus described the invention, what is claimed is:—

1. In a device of the class described, a casing having an opening; gates slidable in the casing and controlling the opening; arms pivoted to the casing and connected with the gates; a shaft journaled in the casing; eccentrics on the shaft; and straps operating with the eccentrics, the straps being pivotally connected with the arms.

2. A device of the class described, constructed as set forth in claim 1, and further characterized by the fact that the shaft is provided with a pivoted handle, there being projections on the casing, coöperating with the handle, one at a time, when the gates are in open position and in closed position.

In testimony that I claim the foregoing as my own, I have hereto affixed my signature in the presence of two witnesses.

WESLIE MARCH ROADES.

Witnesses:
SAM BLIZZARD,
CHAS. W. SWAN.